July 30, 1968   S. H. RAYNES   3,394,591
HEAT MOTOR AND SELF-BALANCING POTENTIOMETER
Filed July 2, 1965   7 Sheets-Sheet 1

INVENTOR
Stephen Henry Raynes
BY
Baldwin & Wight
ATTORNEYS

July 30, 1968  S. H. RAYNES  3,394,591
HEAT MOTOR AND SELF-BALANCING POTENTIOMETER
Filed July 2, 1965  7 Sheets-Sheet 4
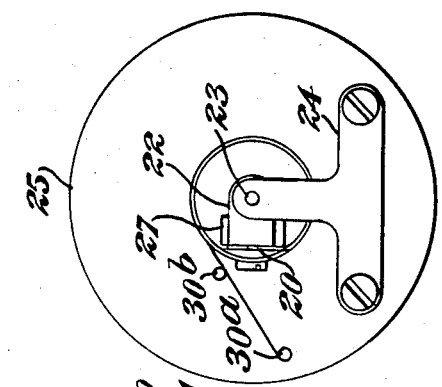
Fig.6.c
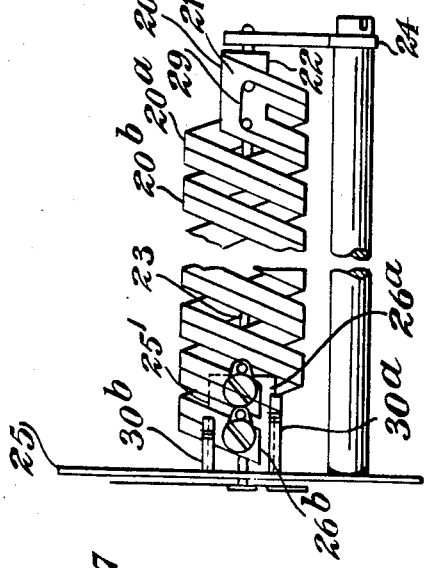
Fig.6.a
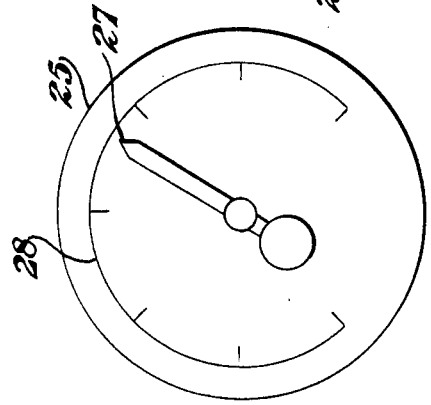
Fig.6.b
INVENTOR
Stephen Henry Raynes
BY
Baldwin & Wight
ATTORNEYS

United States Patent Office 3,394,591
Patented July 30, 1968

3,394,591
HEAT MOTOR AND SELF-BALANCING POTENTIOMETER
Stephen Henry Raynes, Aylesbury, England, assignor to Negretti & Zambra Limited, Aylesbury, England, a corporation of the United Kingdom
Filed July 2, 1965, Ser. No. 469,179
Claims priority, application Great Britain, July 15, 1964, 29,204/64
10 Claims. (Cl. 73—359)

ABSTRACT OF THE DISCLOSURE

A self-balancing potentiometer for measuring the value of an input signal voltage includes a heat motor having two members, at least one of which is movable in response to the application of heat thereto. The heat motor is mechanically coupled to movable mechanical provisions to control the positioning of the movable mechanical provisions. An electrical heater is provided in heat-exchange relation with the heat motor to apply heat thereto. A variable resistive conductive path is coupled to one of the heat motor members and is connected into a comparison circuit or resistive bridge across which is applied a voltage source. An input signal to be measured by the potentiometer is compared with the voltage drop across the resistive path in the comparison circuit. A resultant signal is applied to an amplifier and the output of the amplifier controls the energization of the aforementioned heater to effect actuation thereof indicative of the applied input signal.

---

This invention relates to an improved heat motor and to a self-balancing potentiometer comprising such a heat motor.

Heat motors are known in which the first ends of two members are rigidly connected together, their second ends being so coupled together and to a mechanical device, that the position of the mechanical device depends upon the temperatures of the two members.

According to the present invention a heat motor comprises first and second members, first ends at least of the members being rigidly connected together and second ends of the members being so coupled together and to a mechanical device, that the position of the device depends upon the temperature of at least one of the members; at least one of the members whose temperature controls the position of the device itself having an electrical resistance, or having thermally connected thereto electrical resistance means, capable of providing an electrical signal related to the temperature of the member.

Said electrical resistance means may comprise an electrical conductor of such material and so intimately arranged in relation to the member that its resistance is closely related to the temperature of the member.

The heat motor may also comprise electrical heating means for heating at least one of the members whose position controls the position of the device.

In conventional self-balancing potentiometers the voltage of an input electrical signal is compared with a voltage produced by means of a resistance device within the instrument. The difference between the two voltages is used to control a motor, which adjusts a variable element associated with the resistance device, until the two voltages have been made equal. The amount of the movement of the variable element is used, as a measure of the value of the input electrical signal, to actuate an index, recording pen or control devices.

The resistance device is usually a potentiometer and the variable element is a contact moving over the potentiometer resistance element. This contact is driven, through a gear box, by means of a servo motor. Such an instrument is complicated and subject to defects due to wear; in particular, the moving contact tends to have uncertain electrical action, from this cause.

According to a further aspect of this invention, a self-balancing potentiometer comprises a heat motor, as hereinbefore described and including electrical heating means together with means for comparing the heat motor electrical signal or signals with an input electrical signal to provide a control signal for controlling the electrical heating means so that the position of the mechanical device depends upon the input electrical signal; the mechanical device being arranged to actuate an indicating, recording or control device or any combination of such devices.

The two members of the heat motor may comprise an inner tubular member of a first material having a certain coefficient of thermal expansion, coaxially surrounded by an outer tubular member of a second material whose coefficient of thermal expansion is less than that of the first material, the inner member having said electrical conductor intimately arranged in relation to its outer surface; the electrical heating means comprising an electric heater within the inner member. The coefficient of expansion of the outer tubular member may have a value of zero or a small positive or negative value; it may, for example, comprise a 36% nickel/iron alloy, or a synthetic resin having a positive temperature coefficient and compounded with a dimensional stabilizer (such as lithium aluminium silicate) having a negative temperature coefficient.

In another embodiment of a self-balancing potentiometer the first and second members together comprise a double helix of bimetallic strip, one member comprising one metal and the other member the other metal, the two helices being electrically and mechanically connected rigidly together at a first end of the double helix, which end is coupled to the mechanical device and is capable of adopting a rotational position related to the temperature of the double helix, the second end of the double helix being fixed in relation to the axis of rotation of the first end, each helix being electrically insulated from the other at the second end and provided with electrical connection means for connection to a source of electric current which current, in passing through the two helices in series, will heat the two members; said electrical conductor being cemented along the length of each helix in intimate thermal connection with one member but electrically insulated therefrom.

In a yet further embodiment of a self-balancing potentiometer, the heat motor comprises an inner tubular member coaxially surrounded by an outer tubular member, each tubular member having an electrical conductor intimately arranged in relation to its outer surface so that the resistance of the conductor is closely related to the temperature of the corresponding member. An electric heater may be provided within the inner tubular member.

Such self-balancing potentiometers are particularly suitable for use with thermocouple temperature measuring devices or resistance thermometers.

In order that the invention may be more clearly understood exemplary embodiments will now be described, with reference to the drawings (FIGURES 1 to 4) accompanying the Provisional specification, and the drawings accompanying this specification in which.

Figure 5:
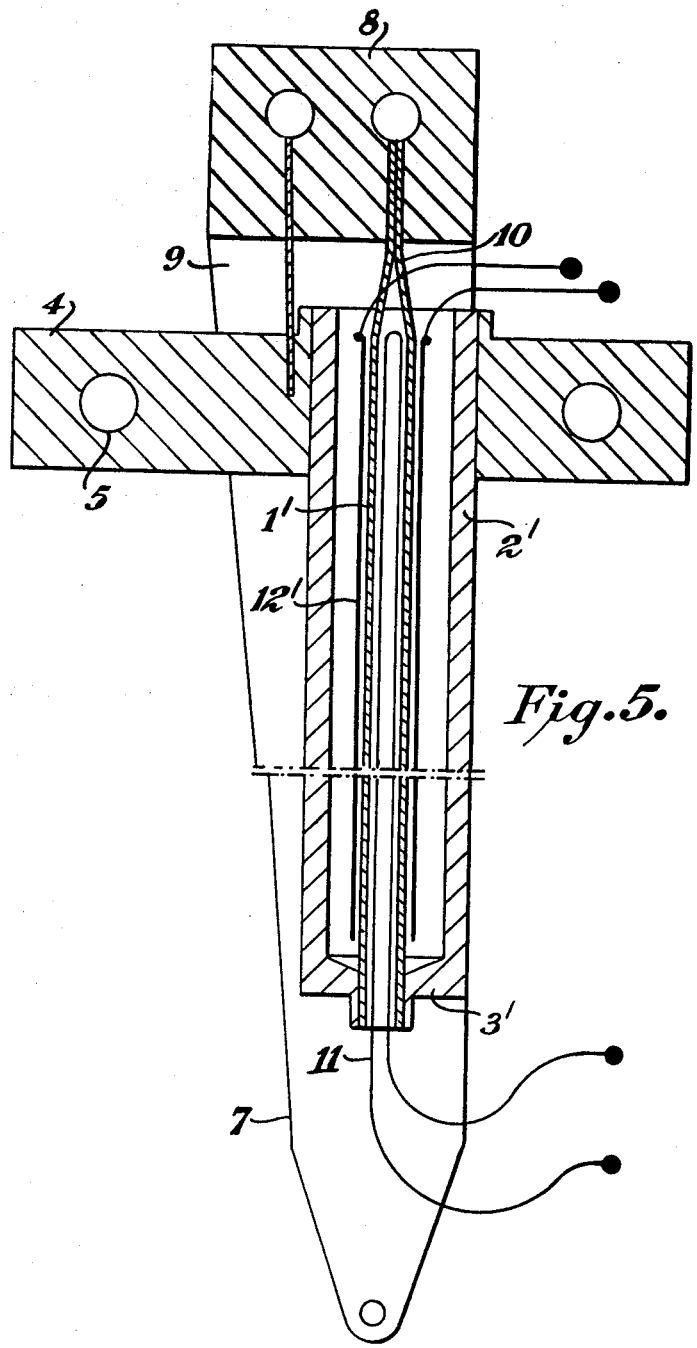
FIGURE 5 is a vertical diagrammatic section through another embodiment of a heat motor.
Figure 7:
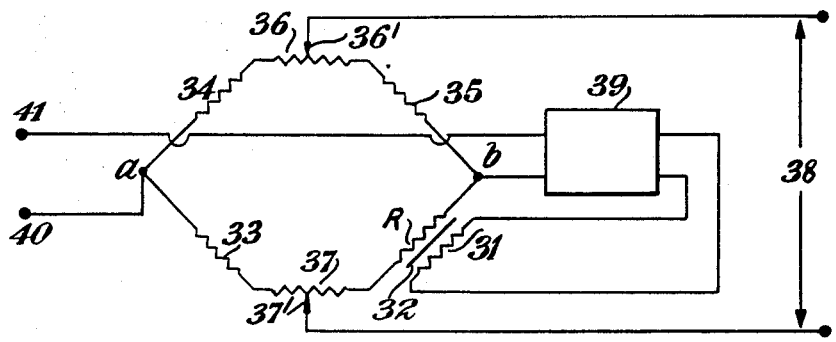
Figure 8:
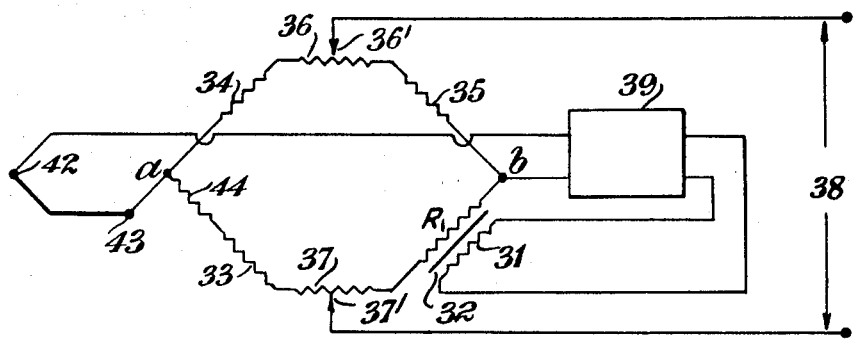
Figure 9:
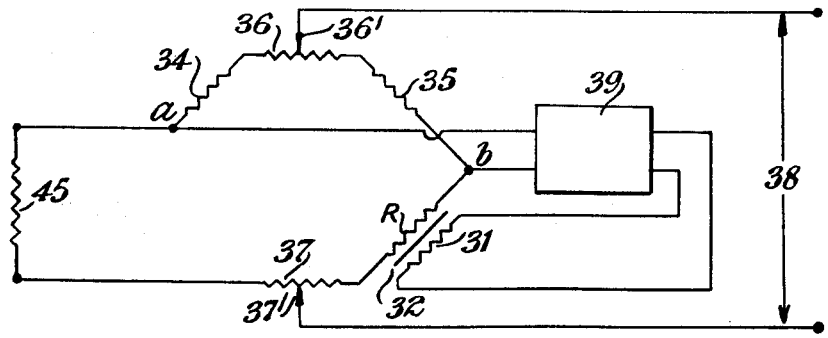
Figure 10:
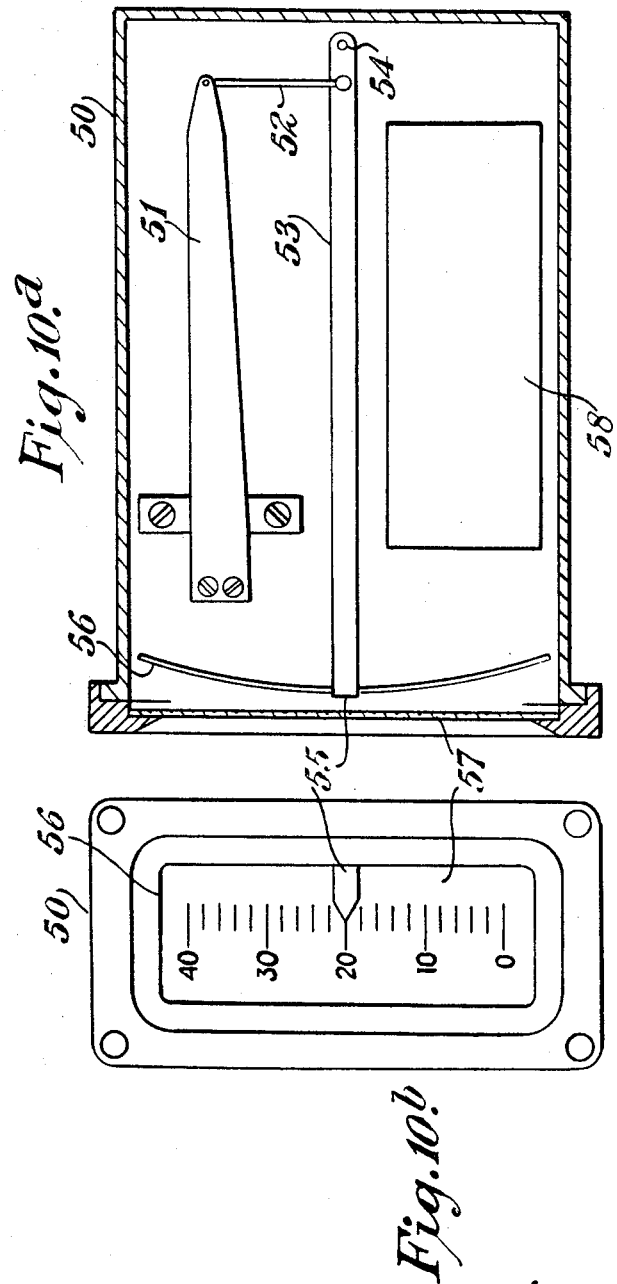
Figure 11:
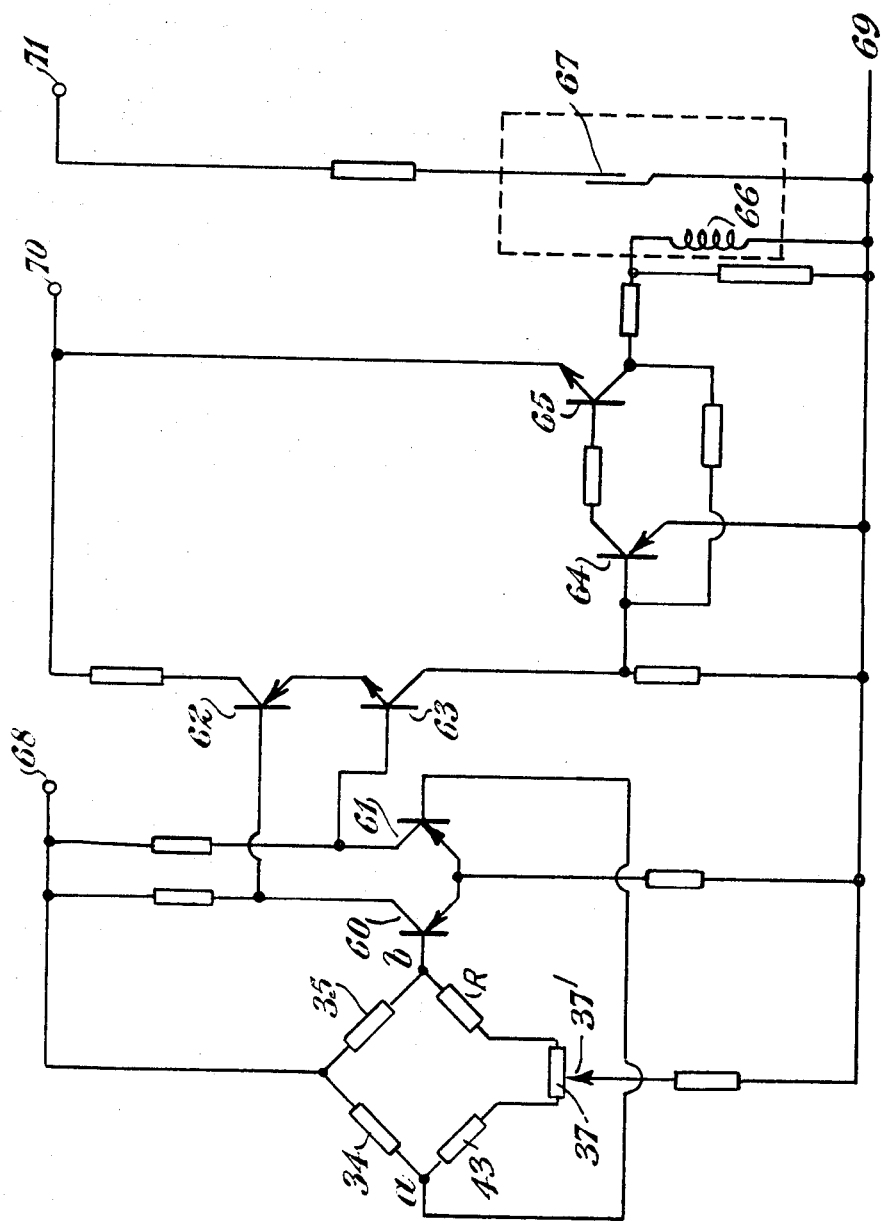

FIGURES 6a, b and c show a diagrammatic view of a third embodiment of a heat motor, coupled to an index;

FIGURE 7 illustrates, in principle, the electrical circuit of an embodiment of a self-balancing potentiometer comprising a heat motor such as is illustrated in FIGURE 5 or FIGURE 6;

FIGURE 8 is a circuit diagram illustrating a modification of FIGURE 7, including a thermocouple thermometer;

FIGURE 9 is a circuit illustrating another modification of FIGURE 7, including a resistance thermometer;

FIGURES 10a and 10b show a diagrammatic end view and longitudinal section of an indicating self-balancing potentiometer according to an embodiment of the invention; and FIGURE 11 is a more detailed circuit diagram of an arrangement similar to that of FIGURE 9, including a transistor amplifier.

Figure 1:
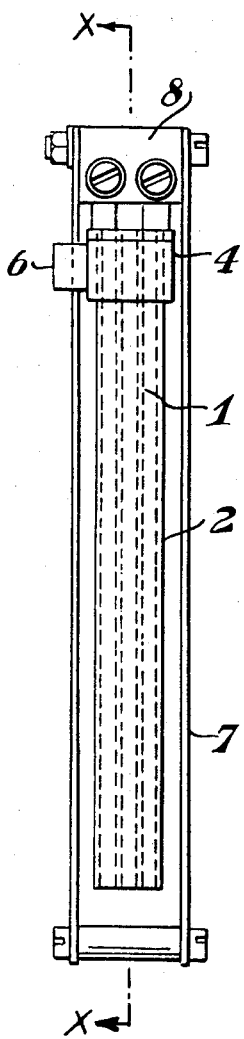
FIGURE 1 is a somewhat diagrammatic elevation of one embodiment of a heat motor.
Figure 2:
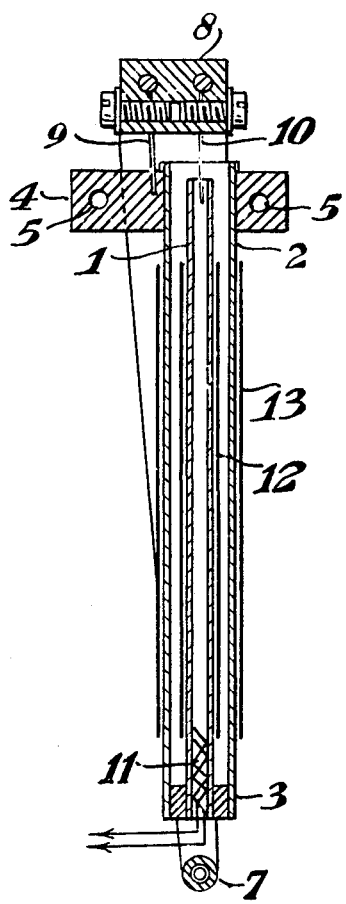
FIGURE 2 is a section on the line X—X of FIGURE 1.

In FIGURES 1 and 2, 1 is an inner tube rigidly fixed to the lower end of an outer tube 2 at an annular plug 3 (in FIGURE 2). The outer tube is rigidly fixed to a block 4, which has two holes 5 (shown in FIGURE 2) and corresponding projections 6 (only one of which is shown in FIGURE 1) for mounting the heat motor on a support, which is not shown. A lever 7 terminates, at its upper end, in a block 8 which is connected to block 4 by a flexible member 9 and to the upper end of the inner tube 1, by a flexible member 10. An electrical heating element 11 is arranged within the inner tube 1, in close heat exchange relationship therewith. When the heating element 11 is energized, the heat causes extension of the inner tube and this extension causes the lever to rotate about the hinge formed by the flexible members 9 and 10. The heat travelling outwards will cause some extension of the outer tube but, owing to the dispositon of the tubes, the inner tube will become hotter than the outer tube and the lever will move, in response to the difference of temperature between the inner and outer tubes. When the heating element is de-energised, the temperatures of the two tubes tend to become equal and the lever moves back, towards its original equilibrium position.

Figure 3:
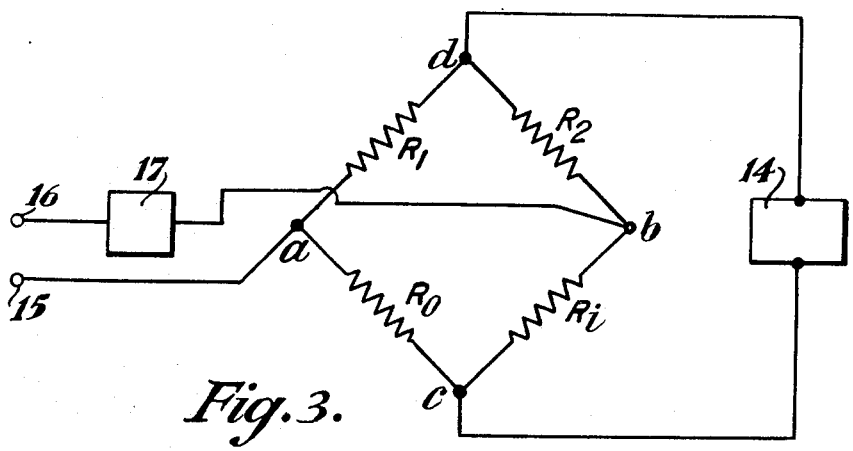
FIGURE 3 is a diagram illustrating, in principle, the electrical circuit of an embodiment of a self-balancing potentiometer comprising the heat motor of FIGURES 1 an 2.

In FIGURE 2, a first electrical conductor 12 is shown in close heat exchange relationship with the inner tube 1 and a second electrical conductor 13 is, similarly, shown in close heat exchange relationship with the outer tube 2. These electrical conductors may, for example, comprise windings of platinum wire; the first conductor 12 has resistance $R_1$ and the second conductor 13 has resistance $R_0$. These resistance values will vary, according to the temperatures of the respective tubes but, in this embodiment, are equal when the tubes are in temperature equilibrium. The conductors, designated as resistors $R_1$ and $R_0$, are shown in FIGURE 3, connected to form two adjacent arms of a bridge network. The other two arms of the bridge are fixed resistors $R_1$, $R_2$, whose resistances are equal and much greater than $R_1$ and $R_0$; for example, 100 $R_1$ at 18° C.

A constant voltage electrical supply source 14 is connected to the common junction $d$, of the resistors $R_1$ and $R_2$, and to the common junction $c$, of the resistors $R_1$ and $R_0$.

An input electrical signal, to be measured, is applied through terminals 15 and 16, in FIGURE 3. Terminal 15 is connected to the junction $a$, between resistors $R_0$ and $R_1$; terminal 16 is connected, through the input circuit of an amplifier 17, to the junction $b$, between resistors $R_1$ and $R_2$. The amplifier 17 controls the current supplied to the heating element 11, shown in FIGURE 2 but not in FIGURE 3, according to the amplifier input voltage.

The self-balancing potentiometer according to this invention and illustrated in FIGURES 1, 2 and 3, operates as follows. Assume, initially, that the input signal voltage is zero, the heater 11 is not energised, and the tubes 1 and 2 are in temperature equilibrium. Then $R_1=R_0$ and the potential between junctions $a$ and $b$, in FIGURE 3, is zero; the input voltage to the amplifier 17 is thus also zero and the amplifier is such that its output is then zero. If, now, an input signal voltage other than zero is applied to terminals 15 and 16, the input voltage to the amplifier 17 will be the difference between this input signal voltage and the potential between junctions $a$ and $b$. The amplifier will then provide an output, energising the heater which, in turn, causes the lever 7 to move and the resistance $R_1$ and $R_0$ to vary by different amounts. The bridge network thus becomes unbalanced and an unbalanced potential appears between junctions $a$ and $b$, the value of this potential being related to the difference between the temperatures of the tubes and, therefore, to the movement of the lever. This unbalance potential constitutes the feedback electrical signal, related to the movement of the lever. The circuit arrangement is such that the feedback signal opposes the input signal at the input of the amplifier 17; which amplifier provides the means for controlling the heating of the inner tube 1, in accordance with the difference between the input electrical signal and the feedback electrical signal. When the lever 7 is moved a certain amount, the magnitude of the feedback signal will so approach that of the input signal that the input to the amplifier 17 will fall to a value capable of only maintaining the heater 11 at a temperature which will insure that the position of the lever 7 represents the value of the input signal voltage. Changes in the input signal will cause corresponding changes in the maintained temperature of the heater, and the lever 7 will move in accordance with variations of the input signal, so long as such variations are not too fast to be followed by the thermo-mechanical system. The lever 7 can be used to actuate a pointer, recording pen, control devices, or the like.

The amplifier 17 may be such that it varies the current flowing in the heater element 11, so as to increase the current when the input signal increases relative to the feedback signal and vice versa. Alternatively, it may be of the relay type providing a fixed output, when the input signal exceeds the feedback, and a zero output when the feedback signal exceeds the input signal.

The electrical conductors 12 and 13 in FIGURE 2, may for example be wires of a material having a suitable temperature coefficient of resistance, suitably insulated and wound in helical grooves cut in the outer surfaces of the inner and outer tubes. By way of a second example, the conductors may comprise films of a suitable material, deposited on the outer surfaces of the tubes, over a layer of an electdical insulating material.

Figure 4:
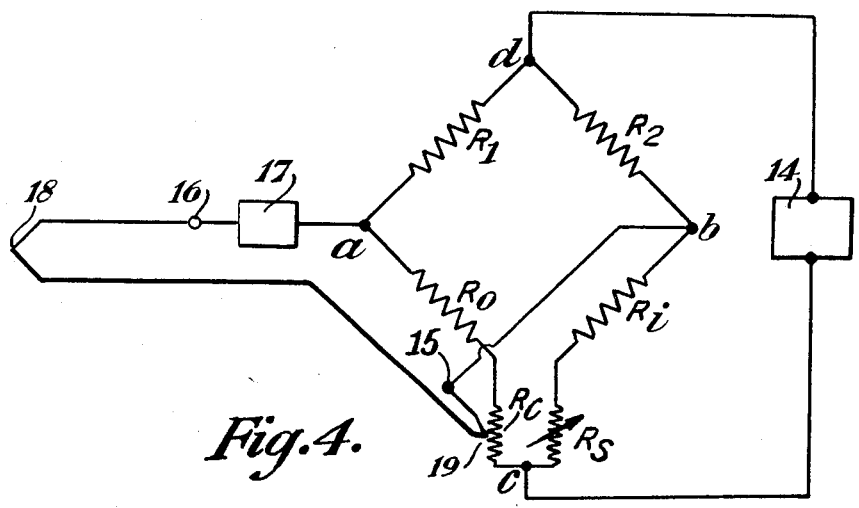
FIGURE 4 is a circuit diagram illustrating a modification of FIGURE 3 including the hot and cold junctions of a thermocouple.

Part of the circuit of a second embodiment of the present invention is illustrated in FIGURE 4. This embodiment includes a measuring thermocouple 18 and a cold junction 19, connected in series to form an input signal source. The input signal is the difference between the voltage of the thermocouple 18 and the cold junction 19 and is applied, through the amplifier 17, to the junctions $a$ and $b$ of the bridge network. A resistor $R_c$, included in series in the bridge arm containing the resistor $R_0$, is arranged in close heat exchange relationship with the cold junction and is such that its resistance varies in proportion to the temperature of that junction. A variable resistor $R_s$ provides means for balancing the bridge network when the heat motor is in temperature equilibrium and when the measuring thermo junction and the cold junction are at the same temperature. The other components of this embodiment are essentially the same as those of the first embodiment described. The circuit values can be so selected, that the movement of the lever of the heat motor is proportional to the temperature of the measuring thermocouple, the system being compensated for variations in the temperature of the cold junction by corresponding variations in the feedback signal, caused by resistor $R_c$.

FIGURE 5 illustrates a modification of the heat motor shown in FIGURES 1 and 2; items designated by the numerals 4, 5 and 7 to 11 are the same as described connection with FIGURES 1 and 2. An inner tube 1' and an outer tube 2' correspond to the tubes 1 and 2 of FIGURES 1 and 2, being rigidly fixed together at their lower ends 3'; the outer tube 2' is rigidly fixed to the block 4.

The outer tube is made of a material having a coefficent of thermal expansion less than that of the material of the inner tube; preferably, the material of the outer tube has a coefficient of expansion which is substantially zero. One suitable material is a 36% nickel/iron alloy. Another suitable known material comprises a synthetic polymer, having a positive coefficient of expansion, and a material such as lithium aluminum silicate, having a negative coefficient of expansion; the relative proportions of the components may be selected, so that the material has a desired negative, zero, or small positive coefficient of expansion. The inner tube may be made of austenitic steel.

In this embodiment of a heat motor, only the inner tube has an electrical conductor, 12', in close heat exchange relationship with it; this conductor 12' corresponds to the conductor 12 of FIGURE 2. When the heater is energised, heat travels out from the heater, causing expansion of the inner tube but lesser, or zero, expansion or contraction of the outer tube, according to its coefficient of expansion; the lever 7 will thus move in response to the temperature of the inner tube, providing the tubes are not such and so arranged that expansion of the inner tube is exactly balanced by contraction of the outer tube.

Another embodiment of a heat motor is illustrated in FIGURES 6a, b and c. In these figures 20 is a double helix of bimetallic strip, individual helices being designated 20a and 20b. One heat motor member comprises the inner metal of the helices, while the other member comprises an outer metal of the helices; the members are, by the bimetallic strip construction, rigidly connected together throughout their length. At the end 21 of the double helix, the helices are electrically and mechanically connected together and mechanically secured to a block 22, itself secured to a shaft 23, which is capable of rotating in bearings in supports 24 and 25. Ends 26a and 26b of the individual helices, at the end 26 of the double helix, are rigidly secured via a block 25' to the support 25. The ends 26a and 26b are electrically insulated from one another and arranged from connection to a source of electrical current; current can thus pass through the helices 20a and 20b, in series, heating them and producing a twisting motion in the double helix, in known manner, by virtue of its bimetallic construction. The end 26 of the double helix being anchored to the support 25, the block 22 and shaft 23 will adopt a rotational position about the axis of the shaft, according to the temperature of the helix. The shaft 23 carries an index 27 whose position, in relation to a scale 28 on the support 25, accordingly depends upon the temperature of the double helix.

An electrical conductor 29, which may for example be a platinum wire, is secured to the outer surfaces of the two helices 20a and 20b; that is, to one of the heat motor members. The conductor is insulated from the member by, for example, a layer of silicone varnish; which layer or an additional layer may provide means for securing the conductor. At the end 26 of the double helix the ends of the conductor 29 are connected to terminals 30a and 30b.

The heat motors illustrated in FIGURES 5 and 6a, b and c, are each provided with one electrical conductor in close thermal relationship with only one heat motor member; the circuits of the electrical signal comparison means of corresponding self-balancing potentiometers may therefore be simpler than those of FIGURES 3 and 4. Three examples of suitable circuits are shown in FIGURES 7 to 9.

In FIGURE 7 an electric heater 31 is thermally coupled to a heat motor member 32, which is thermally coupled to an electrical conductor forming resistor R. The resistor R is connected in one arm of a bridge, the other arms of which comprise resistors 33, 34 and 35; resistors 36 and 37 are provided with sliders 36' and 37', respectively, which sliders form one pair of diagonally opposite bridge connections. These connections 36' and 37' are connected to a constant voltage supply 38. The other pair of diagonally opposite bridge connections are designated a and b. The connection b is connected directly to the resistor R and to one input terminal of an amplifier 39; the opposite connection, a, is directly connected to one input terminal 40 of the self-balancing potentiometer, the other input terminal 41 of the potentiometer being connected directly to the other input terminal of the amplifier 39. The amplifier output is connected to the electric heater 31.

The self-balancing potentiometer of FIGURE 7 operates as follows. The input terminals 40 and 41 are connected to an external circuit which is capable of providing an input signal to be measured. Assume that, initially, the input signal corresponds to the zero of a desired measurement range; this input signal may, in fact, be zero or it may have another predetermined value. The bridge is then adjusted by means of sliders 36' and 37', until the index of the potentiometer comes to rest at the zero of an associated scale (for example, the scale 28 of FIGURE 6b). At this zero setting it is desirable that the member 32 be at a temperature substantially above the ambient temperature (for example at 100° C.), so that variations in the ambient temperature shall have small effect on the zero index position. The coupling between the members and the index must permit free movement of the index beyond the zero point, for a sufficient distance, when the heater 31 is not energised. Provided the gain of the amplifier is sufficiently high, the effects of ambient temperature variations on the zero position will be small.

The various parameters of the circuit must be so selected that, at the maximum of a desired measurement range, the temperature of the member 32 does not exceed that permitted by the maximum working temperature of the associated insulation, particularly that between the member and the conductor R; the maximum temperature may, for example, be 300° C.

The potentiometer of FIGURE 7 may, alternatively, be so arranged that the member 32 is at the maximum permissible temperature, when the input signal corresponds to the zero of the measurement scale; the energisation of the heater and the temperature of the member being reduced, as the potentiometer input signal increases.

FIGURE 8 shows the circuit of FIGURE 7, modified in that hot and cold junction 42 and 43, respectively, of a thermocouple measuring device are connected in series, directly in place of the input terminals 40 and 41. Resistor 44, in series with resistor 33, is arranged in close heat exchange relationship with the cold junction 43, in a manner similar to that of resistor $R_c$ and cold junction 19 in FIGURE 4, and similarly provide compensation for variations in the temperature of the cold junction.

FIGURE 9 shows a further modification of the circuit of FIGURE 7, wherein a resistance thermometer element 45 (for example, of platinum) replaces the resistor 33 of FIGURE 7; the amplifier input connection, shown connected to terminal 41 in FIGURE 7 is, in FIGURE 9, connected to the bridge connection a. The potentiometer of FIGURE 9 is adjusted initially in the manner described with reference to FIGURE 7, the resistance element 45 being maintained at a temperature corresponding to the zero of the measurement range. Alternatively, the resistance element 45 can be maintained at any convenient temperature, within the measurement range, and the bridge be balanced so that the index reads that temperature.

The heat motors of self-balancing potentiometers such as have been described herein can be constructed, in known manner, to provide sufficient force to operate various indicating, recording and control devices, without introducing significant error in calibration.

One arrangement for coupling an indicator is illustrated in FIGURE 6a, b and c. Another arrangement of an index coupled to a heat motor such as is illustrated in FIGURES 1 and 2 or FIGURE 5, is shown in FIGURES 10a and b.

In FIGURES 10a and b, 50 is a case, within which is mounted a heat motor 51, coupled by means of a link 52 to a lever 53, which is pivoted at one end on a pivot 54 and carries an index 55 at its other end. The index can move over a scale 50 which can be viewed through a window 57, in the end of the case. The signal comparison circuit may be mounted as indicated at 58, the components preferably being mounted on a single assembly board.

FIGURE 11 illustrates a bridge and amplifier 39 in greater detail. The bridge is substantially the same as that of FIGURE 9, except that the adjustment facility represented by FIGURE 9, except that the adjustment facility represented by resistor 36 and slider 36' is omitted. The bridge terminals a and b are connected to the bases of transistors 61 and 60, respectively; these transistors are common-emitter connected, as a differential amplifier stage. The output of this stage is connected to a second amplifier stage, comprising a NPN transistor 63 and a PNP transistor 62, connected to cascode. This stage is coupled to a power stage, comprising transistors 64 and 65, whose output current passes through a coil 66, arranged to actuate a reed switch 67, for controlling the supply of current to the electrical heater 31 (not shown in FIGURE 11). The bridge and first amplifier stage are supplied via a negative terminal 68 and a common positive connection 69 from the constant voltage supply source 38 (not shown in FIGURE 11); the second and output stages are supplied from a smoothed supply source via a negative terminal 70; and the heater is supplied via a terminal 71. Unidentified components are resistors, whose values may be selected in known manner, according to the particular types of transistor used.

What is claimed is:

1. A self-balancing electrical potentiometer for measuring a potentiometer input signal, the potentiometer comprising means for receiving the input signal; a heat motor actuable by electrically generated heat energy and including an output member, means for positioning the output member according to the said heat energy, and means for providing an electrical signal related to the position of the output member; a comparison circuit for comparing the potentiometer input signal with the said electrical signal to provide a resultant control signal; means for supplying electricity for generating the said heat energy; and control means connected to receive the control signal and to control the supply of the said electricity in response thereto, whereby the position of the output member will depend upon the potentiometer input signal.

2. A self-balancing electrical potentiometer for measuring a potentiometer input signal, the potentiometer comprising first and second potentiometer input terminals for receiving the input signal; a heat motor comprising first and second members and movable mechanical means for connection to apparatus to be actuated in accordance with the input signals, said first and second members each having substantially homogeneous thermal properties and being rigidly connected together only at first ends; kinematic linkage means coupling second ends of the members and the mechanical means together to position the mechanical means in dependence upon the temperature of at least one of said members; at least one of said members having an associated first electrically conductive path having a resistance variable with the temperature of said member associated therewith, means for making electrical connection with said first path to provide a temperature-related electrical signal from said first path related to the temperature of said member associated therewith; heater means comprising a second electrically conductive path for electrically heating the at least one of the members whose temperature controls the position of said mechanical means, said second conductive path terminating in terminals for the application of current thereto; control means for controlling the current in said second conductive path, a comparison circuit, said first electrically conductive path being connected into said comparison circuit and said comparison circuit being connected to the potentiometer input for comparing the potentiometer input signal with the temperature-related signal from said first path to provide a control signal to said control means to control the position of the mechanical device in dependance upon the potentiometer input signal.

3. A self-balancing potentiometer as claimed in claim 2 wherein the member to be electrically heated is made of an electrically conductive material, said material providing said second electrically conductive path.

4. A self-balancing potentiometer as claimed in claim 2 wherein the member in association with said first electrically conductive path to provide a temperature-related electrical signal is made of electrically conductive material, said material providing said first electrically conductive path.

5. A self-balancing potentiometer as claimed in claim 2 wherein said members of said heat motor comprise inner and outer tubular members, the inner tubular member coaxially surrounded by the outer tubular member, each tubular member having an electrical conductor intimately arranged in relation to the outer surface of the member to provide said first electrically conductive path; said two conductors being connected in said comparison circuit to provide said control signal in dependance upon the difference between the temperatures of the two members; and said second electrically conductive path of said heater means comprising an electric heater within the inner member.

6. A self-balancing potentiometer as claimed in claim 2 wherein said members of the heat motor comprise an inner tubular member of a first material having a first co-efficient of thermal expansion; and outer tubular member of a second material having a second co-efficient of thermal expansion less than that of the first material; said outer member coaxially surrounding the inner member; said inner member only having an electrical conductor intimately arranged in relation to its outer surface to provide said first electrically conductive path; and wherein said second electrically conductive path of said heater means comprises an electrical heater within the inner member.

7. A self-balancing potentiometer as claimed in claim 6 wherein the co-efficient of expansion of the outer tubular member has a value which is substantially zero.

8. A self-balancing potentiometer as claimed in claim 7 wherein said control means comprises an amplifier having an input and an output; said comparison circuit comprising a resistance bridge having arms thereof connected at connection points, means for applying a voltage source across said bridge, said potentiometer input terminals being connected one each to said amplifier input and to a connection point of said bridge, said first electrically conductive path being connected in one of said bridge arms, a further of said connection points being connected to said amplifier input, said amplifier output being connected to said heater means, whereby signals applied to said amplifier input from said bridge and potentiometer input control the energization of said heater to control the position of said mechanical means.

9. A thermo-couple temperature measuring device comprising a self-balancing potentiometer as claimed in claim 7 wherein said control means comprises an amplifier having an input and an output, said comparison circuit comprising a resistance bridge having arms thereof connected at connection points, means for applying a voltage across said bridge, one of said potentiometer input terminals being connected to said amplifier input, one of said connection points being connected to said amplifier input, a thermo-couple temperature measuring element including hot and cold junctions connected in series across said potentiometer input terminals, said cold junction being connected to a further of said connection points through the connection thereof with one of said potentiometer input terminals, said first conductive path being connected in one of said bridge arms, a compensating resistor being connected in a further of said bridge arms and in heat-exchange relation with said cold-junction of said thermo-couple temperature measuring element, said amplifier output being connected to said heater means, whereby signals applied to said amplifier input from said bridge and said thermo-couple temperature measuring element control the energization of said heater to control the position of said mechanical means.

10. A resistance thermometer comprising a self-balancing potentiometer as claimed in claim 7, said control means comprising an amplifier having an input and an output; said comparison circuit comprising a resistance bridge having arms thereof connected at connection points, means for applying a voltage across said bridge, one of said connection points being connected to both the amplifier input and one of said potentiometer input terminals, a further of said connection points being connected to the amplifier input, a third connection point being connected to the remaining potentiometer input terminal, a resistance thermometer element connected across the potentiometer input terminals, said first conductive path being connected into one of said bridge arms, said amplifier output being connected to said heater means, whereby signals applied to said amplifier input from said bridge and resistance thermometer element control the energization of said heater to control the position of said mechanical means.

References Cited

UNITED STATES PATENTS 959,827   5/1910   Hertzberg _____ 60—23

S. CLEMENT SWISHER, *Primary Examiner.*

WILLIAM HENRY II, *Assistant Examiner.*